United States Patent
Kamon et al.

(10) Patent No.: US 12,343,863 B2
(45) Date of Patent: Jul. 1, 2025

(54) SPHERICAL JOINT AND JOINT STRUCTURE FOR ROBOT HAVING THE SAME

(71) Applicant: KAWASAKI JUKOGYO KABUSHIKI KAISHA, Kobe (JP)

(72) Inventors: Masayuki Kamon, Kobe (JP); So Yukizaki, Kobe (JP); Junichi Karasuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 591 days.

(21) Appl. No.: 17/638,256

(22) PCT Filed: Sep. 1, 2020

(86) PCT No.: PCT/JP2020/033119
§ 371 (c)(1),
(2) Date: Feb. 25, 2022

(87) PCT Pub. No.: WO2021/045057
PCT Pub. Date: Mar. 11, 2021

(65) Prior Publication Data
US 2022/0402148 A1 Dec. 22, 2022

(30) Foreign Application Priority Data
Sep. 2, 2019 (JP) ................................ 2019-159743

(51) Int. Cl.
*B25J 17/02* (2006.01)
*B25J 9/00* (2006.01)
(Continued)

(52) U.S. Cl.
CPC ......... *B25J 17/0283* (2013.01); *B25J 9/0006* (2013.01); *F16C 11/06* (2013.01); *F16C 11/106* (2013.01); *F16C 2322/59* (2013.01)

(58) Field of Classification Search
CPC ..... F16C 11/06; F16C 11/0614; F16C 11/069; F16C 11/106; F16C 9/04; F16C 9/06; B25J 17/0275; B25J 17/0283; B25J 9/0006
See application file for complete search history.

(56) References Cited

U.S. PATENT DOCUMENTS 2,513,027 A * 6/1950 Kruczek ............... F16C 11/106
269/75
3,522,975 A * 8/1970 White ................. F16C 11/0614
384/207
(Continued)

FOREIGN PATENT DOCUMENTS

DE 922450 C * 1/1955
DE 9301268 U1 * 4/1993
(Continued)

*Primary Examiner* — Jonathan P Masinick
(74) *Attorney, Agent, or Firm* — METROLEX IP LAW GROUP, PLLC; Robert L. Scott, Esq.

(57) ABSTRACT

A spherical joint of the present disclosure includes a ball member and a socket having an inner circumferential surface configured to spherically contact the ball member. The socket includes a cage part forming the inner circumferential surface and having an opening, and a bar-shaped connecting part provided to the cage part. A fastening member is disposed at the cage part so as to reduce a space of the opening in the extending direction of the connecting part and such that a gap is formed between the fastening member and the ball member. The opening is formed in a part of the inner circumferential surface other than a part where the largest load is applied.

4 Claims, 6 Drawing Sheets

(51) Int. Cl.
*F16C 11/06* (2006.01)
*F16C 11/10* (2006.01)

(56) References Cited

U.S. PATENT DOCUMENTS

| | | | | |
|---|---|---|---|---|
| 3,597,025 | A | * | 8/1971 | Ringel ................ F16C 11/0623 384/208 |
| 4,780,000 | A | | 10/1988 | Lewis et al. |
| 4,980,805 | A | | 12/1990 | Maglica et al. |
| 6,234,961 | B1 | | 5/2001 | Gray |
| 6,988,696 | B2 | * | 1/2006 | Attee ...................... B25B 5/147 248/214 |
| 7,240,747 | B2 | * | 7/2007 | Miyazaki ............. B25J 17/0275 180/8.1 |
| 8,408,955 | B2 | * | 4/2013 | Boebel .................. F16C 11/106 248/642 |
| 9,157,471 | B2 | * | 10/2015 | Jungeberg ........... F16C 11/0695 |
| 9,157,474 | B2 | * | 10/2015 | Davis ........................ B60B 7/08 |
| 10,012,261 | B2 | * | 7/2018 | Jungeberg ........... F16C 11/0685 |
| 10,022,860 | B2 | * | 7/2018 | Nagatsuka ........... B25J 17/0283 |
| 10,087,982 | B2 | | 10/2018 | Faccioli et al. |
| 10,119,562 | B2 | * | 11/2018 | Boerschig ................ F16C 9/04 |
| 10,828,787 | B2 | * | 11/2020 | Kamon .................... B25J 9/123 |
| 2007/0086849 | A1 | | 4/2007 | Chang et al. |
| 2014/0238177 | A1 | | 8/2014 | Nagatsuka |
| 2014/0254965 | A1 | * | 9/2014 | Giegel .................... F16C 35/02 384/129 |
| 2014/0350558 | A1 | | 11/2014 | Triplett et al. |
| 2017/0137080 | A1 | * | 5/2017 | White ....................... F16B 1/00 |
| 2019/0168400 | A1 | | 6/2019 | Kamon |
| 2023/0003251 | A1 | * | 1/2023 | Lin .................... F16M 11/2014 |

FOREIGN PATENT DOCUMENTS

| | | | | |
|---|---|---|---|---|
| DE | 102019119187 | A1 | * 7/2020 | .............. B23P 15/10 |
| EP | 3144544 | B1 | * 6/2018 | .......... F16C 11/0638 |
| EP | 3385571 | A1 | 10/2018 | |
| FR | 364821 | A | * 8/1906 | |
| FR | 689262 | A | * 9/1930 | |
| FR | 2606472 | A1 | 5/1988 | |
| FR | 2620345 | A1 | * 3/1989 | |
| FR | 2719455 | A1 | * 11/1995 | ............... A47F 8/00 |
| GB | 136048 | A | * 12/1919 | |
| GB | 294456 | A | 7/1928 | |
| JP | H3-501403 | A | 3/1991 | |
| JP | 2011-156146 | A | 8/2011 | |
| WO | 2017/094922 | A1 | 6/2017 | |

* cited by examiner

SPHERICAL JOINT AND JOINT STRUCTURE FOR ROBOT HAVING THE SAME

CROSS-REFERENCE TO RELATED APPLICATIONS

This application is a national stage entry of International Application No. PCT/JP2020/033119 filed on Sep. 1, 2020, which claims priority based on the Article 8 of Patent Cooperation Treaty from the prior Japanese Patent Application No 2019-159743, filed on Sep. 2, 2019, the entire contents of all of which are incorporated herein by reference.

TECHNICAL FIELD

The present disclosure relates to a spherical joint and a joint structure for a robot having the same.

BACKGROUND ART

Drive mechanisms used for a joint structure of a robot are known (for example, see Patent Document 1). A drive mechanism disclosed in Patent Document 1 is, for example, to drive a joint part, such as an ankle joint of a humanoid robot. In this drive mechanism, a tip-end part of a first link member and a base-end part of a second link member, which constitute the ankle joint, are coupled through a spherical joint.

REFERENCE DOCUMENT OF CONVENTIONAL ART

Patent Document

[Patent Document 1] WO2017/094922A1

DESCRIPTION OF THE DISCLOSURE

Problem(s) to be Solved by the Disclosure

However, even in the drive mechanism disclosed in Patent Document 1, the load of the robot may be applied to the spherical joint to cause rattling. In detail, when an inner circumferential surface of a socket which spherically contacts a ball member which constitutes the spherical joint is worn out, or when grease filled up inside the socket ran out, the rattling may be caused in the spherical joint.

The present disclosure is to solve the above-described conventional problem, and one purpose thereof is to provide a spherical joint, and a joint structure for a robot, having the spherical joint, capable of reducing a radius of curvature of an inner circumferential surface of a socket when rattling occurs to increase a contacting area with a ball member so as to eliminate the rattling or suppressing the rattling.

SUMMARY OF THE DISCLOSURE

In order to solve the conventional problem, a spherical joint according to the present disclosure includes a ball member, and a socket having an inner circumferential surface configured to spherically contact the ball member. The socket includes a cage part forming the inner circumferential surface and having an opening, and a connecting part provided to the cage part. A fastening member is disposed at the cage part such that a gap is formed between the fastening member and the ball member, the fastening member being configured to reduce a space of the opening. The opening is formed in a part of the inner circumferential surface other than a part where the largest load is applied.

According to this, even when rattling occurs between the ball member and the inner circumferential surface of the socket, the rattling can be eliminated or suppressed.

Moreover, a joint structure for a robot according to the present disclosure includes the spherical joint described above.

According to this, even when rattling occurs between the ball member and the inner circumferential surface of the socket, the rattling can be eliminated or suppressed.

The above purpose, other purposes, features, and advantages of the present disclosure will be made clear from the following detailed description of suitable embodiments with reference to the accompanying drawings.

Effect of the Disclosure

According to the spherical joint, and the joint structure for the robot, having the spherical joint, even when rattling occurs between the ball member and the inner circumferential surface of the socket, the rattling can be eliminated or suppressed.

MODES FOR CARRYING OUT THE DISCLOSURE

Hereinafter, embodiments of the present disclosure will be described with reference to the drawings. Note that, throughout the drawings, the same reference characters are given to the same or corresponding parts to omit redundant description. Moreover, throughout the drawings, components are selectively illustrated for explaining the present disclosure, and illustration of other components may be omitted. The present disclosure is not limited to the following embodiments.

Embodiment 1

A spherical joint according to Embodiment 1 includes a ball member and a socket having an inner circumferential surface which spherically contacts the ball member. The socket has a cage part forming the inner circumferential surface and having an opening, and a bar-shaped connecting part provided to the cage part. In the cage part, a fastening member configured so as to reduce a space of the opening is disposed such that a gap is formed between the fastening member and the ball member, and the opening is formed in a part of the inner circumferential surface other than a part where the largest load is applied.

Further, in the spherical joint according to Embodiment 1, the cage part of the socket is formed in a C-shape or a U-shape, and the fastening member may be configured to bring both ends of the cage part closer to each other.

Moreover, in the spherical joint according to Embodiment 1, the part of the inner circumferential surface of the socket where the largest load is applied may be a part located in an extending direction of the connecting part.

A joint structure for the robot according to Embodiment 1 is provided with the spherical joint with any one of the structures described above.

In the joint structure for the robot according to Embodiment 1, the spherical joint may be disposed so that the opening is located outward of the robot.

The joint structure for the robot according to Embodiment 1 may be used for an ankle joint or a hip joint of a humanoid robot.

Below, examples of the spherical joint and the joint structure for the robot having the spherical joint according to Embodiment 1 are described with reference to FIGS. 1 to 5.

[Configuration of Robot]

First, a configuration of the robot provided with the joint structure according to Embodiment 1 is described with reference to FIG. 1.

Figure 1:
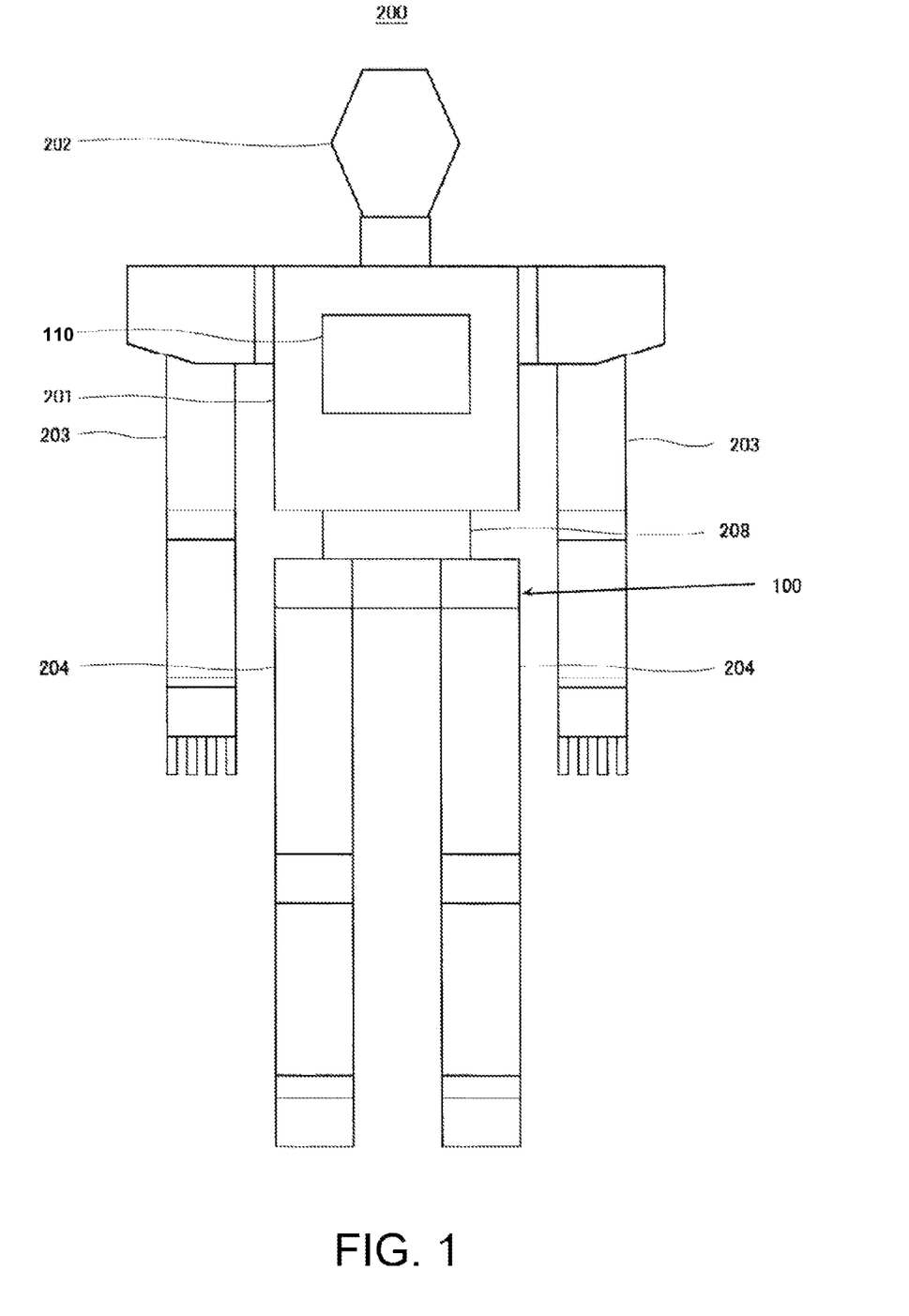
FIG. 1 is a schematic diagram illustrating an outline configuration of a robot provided with a joint structure according to Embodiment 1.

FIG. 1 is a schematic diagram illustrating an outline configuration of the robot provided with the joint structure according to Embodiment 1.

As illustrated in FIG. 1, a robot 200 includes a body 201, a head 202, a pair of arms 203, a pair of legs 204, and a control device 110 disposed inside the body 201. The leg 204 may be connected to a waist 208 which constitutes a part of the body 201 via a joint structure 100 according to Embodiment 1 (described later).

[Configuration of Joint Structure for Robot]

Figure 2:
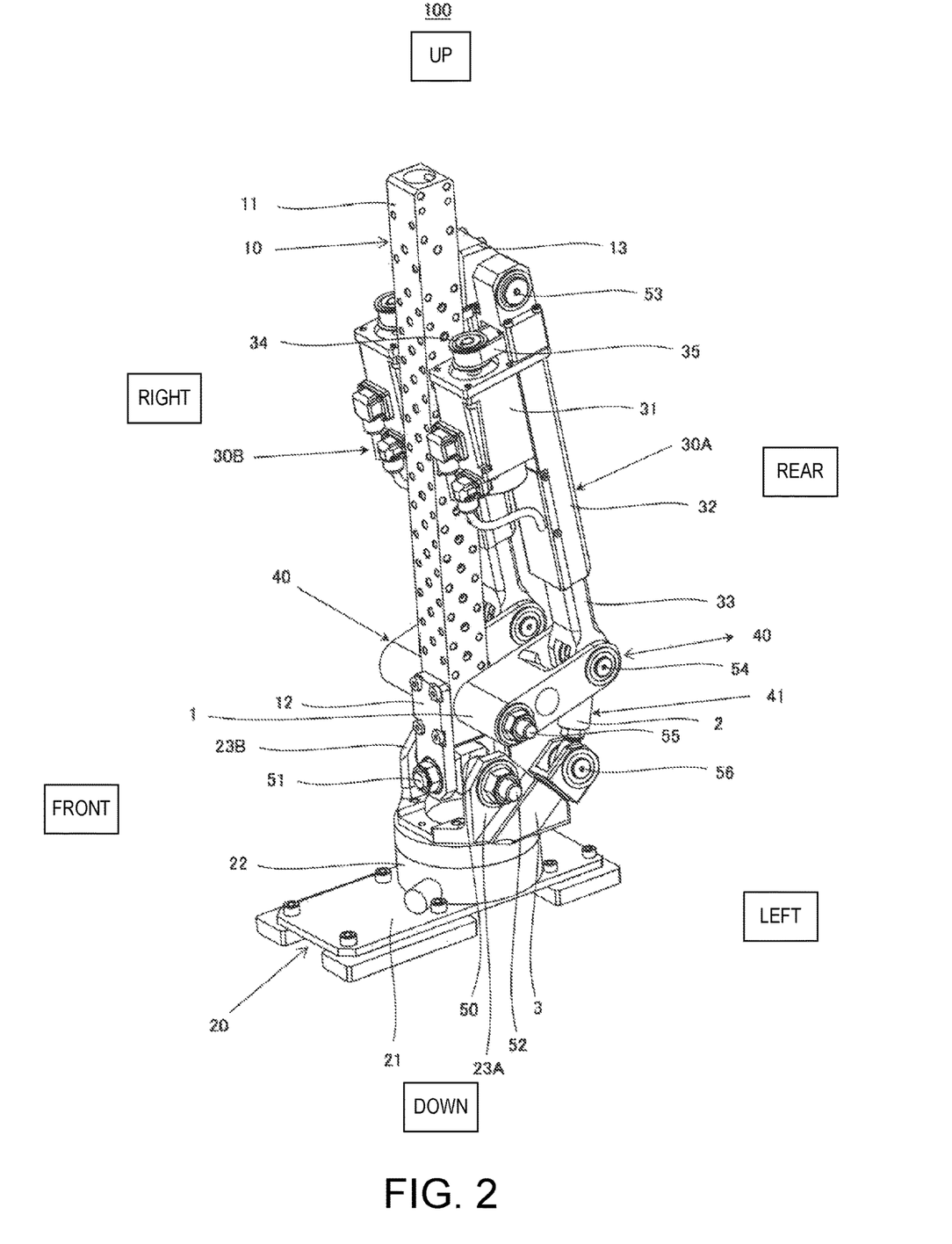
FIG. 2 is a perspective view illustrating an outline configuration of the joint structure for the robot, provided with a spherical joint according to Embodiment 1.

FIG. 2 is a perspective view illustrating an outline configuration of the joint structure for the robot, provided with a spherical joint according to Embodiment 1. Note that, in FIG. 2, an up-and-down direction, a front-and-rear direction, and a left-and-right direction in the joint structure for the robot are expressed as an up-and-down direction, a front-and-rear direction, and a left-and-right direction in the drawing.

As illustrated in FIG. 2, the joint structure 100 for the robot according to Embodiment 1 includes a first link 10, a second link 20, a first linear-motion actuator 30A, a second linear-motion actuator 30B, and a joint part 40.

The first link 10 and the second link 20 are rotatably coupled to each other via the joint part 40. Further, the joint structure 100 for the robot according to Embodiment 1 is configured so that the second link 20 pivots relative to the first link 10 by the first linear-motion actuator 30A and the second linear-motion actuator 30B carrying out a reciprocating motion.

Note that, although in the joint structure 100 for the robot according to Embodiment 1 the first link 10 constitutes a leg part of the robot, the second link 20 constitutes a foot part of the robot, and the joint part 40 constitutes an ankle joint, it is not limited to this configuration.

For example, in the joint structure 100, the first link 10 may constitute a lower body part (waist part) of the body of the robot, the second link 20 may constitute a thigh part of the robot, and the joint part 40 may constitute a hip joint of the robot. If the joint part 40 constitutes the hip joint of the robot, the up-and-down direction illustrated in FIG. 2 will be inverted.

The first link 10 has a frame member 11 formed in a box shape, an attaching member 12 formed in a strip shape, and a block member 13 formed in a box shape. The attaching member 12 is provided to a lower-end part of a front surface of the frame member 11. The block member 13 is provided to an upper-end part of a rear surface of the frame member 11.

Further, the second link 20 has a plate-shaped first member 21 and a pillar-shaped (here, cylindrical) second member 22. The second member 22 is provided with a pair of flange parts 23A and 23B.

The first link 10 and the second link 20 are connected to each other via a block member 50. In detail, the block member 50 is rotatably attached to a lower-end part of a rear surface of the attaching member 12 via a first shaft member 51 which extends in the front-and-rear direction. Further, the block member 50 is disposed between the pair of flange parts 23A and 23B, and a second shaft member 52 which extends in the left-and-right direction is inserted in these members.

Therefore, the second link 20 can pivot, relative to the first link 10, about a roll axis (first shaft member 51) and about a pitch axis (second shaft member 52).

Further, the first linear-motion actuator 30A is disposed at a left side surface of the frame member 11 of the first link 10. Similarly, the second linear-motion actuator 30B is disposed at a right side surface of the frame member 11 of the first link 10. Note that, since the second linear-motion actuator 30B has the same configuration as the first linear-motion actuator 30A, detailed description thereof is omitted.

Here, the first linear-motion actuator 30A has a drive motor (servo motor) 31, a casing 32, a rod member 33, a pulley 34, and a belt 35. A ball screw mechanism is disposed inside the casing 32 (not illustrated). Further, a nut which constitutes the ball screw mechanism is connected to the rod member 33. The first linear-motion actuator 30A is configured so that rotation of the drive motor 31 is transmitted to the ball screw mechanism via the pulley 34 and the belt 35 to reciprocate the rod member 33 relative to the casing 32. Note that the first linear-motion actuator 30A is not limited to the above configuration, and various known linear-motion actuators may be used.

Further, a base-end part of the first linear-motion actuator 30A (an upper-end part of the casing 32) is rotatably connected to the block member 13 through a third shaft member 53 which extends in the left-and-right direction. The joint part 40 is connected to a tip-end part of the first linear-motion actuator 30A (a lower-end part of the rod member 33).

The joint part 40 has a first link member 1, a second link member 2, and a third link member 3. Note that since the joint part 40 connected to the tip-end part of the second linear-motion actuator 30B is configured similarly to the joint part 40 connected to the tip-end part of the first linear-motion actuator 30A, detailed description thereof is omitted.

A tip-end part of the first link member 1 is rotatably connected to a lower part of the frame member 11 through a fifth shaft member 55 which extends in the left-and-right direction. Further, a rear-end part of the first link member 1 is formed in a U-shape, and is disposed so as to sandwich the rod member 33 in the left-and-right direction. A fourth shaft member 54 which extends in the left-and-right direction is inserted in the rear-end part of the first link member 1.

The second link member 2 is formed in a cylindrical shape, and a spherical joint 60 according to Embodiment 1 (see FIGS. 3 to 5) is disposed at each of an upper-end part and a lower-end part of the second link member 2. Note that, below, a mechanism comprised of the second link member 2, and the spherical joint 60 disposed at both the ends of the second link member 2 may also be referred to as a "joint mechanism 41." The joint mechanism 41 (spherical joint 60) will be described later in detail.

An upper-end part of the joint mechanism 41 is disposed in an interior space of a rear-end part of the rod member 33 formed in the U-shape. In other words, the rear-end part of the rod member 33 is disposed so as to sandwich the upper-end part of the joint mechanism 41 in the left-and-right direction. As described above, the rear-end part of the first link member 1 is disposed so as to sandwich the rear-end part of the rod member 33 in the left-and-right direction.

The fourth shaft member 54 is inserted in the upper-end part of the joint mechanism 41 and the rear-end part of the rod member 33. In other words, the fourth shaft member 54 is disposed so as to be inserted in the rear-end part of the first link member 1, the rear-end part of the rod member 33, and the upper-end part of the joint mechanism 41.

A lower-end part of the joint mechanism 41 is disposed in an interior space at the upper-end part of the third link member 3 formed in the U-shape. In other words, the upper-end part of the third link member 3 is disposed so as to sandwich the lower-end part of the joint mechanism 41 in the left-and-right direction. A sixth shaft member 56 is inserted in the lower-end part of the joint mechanism 41 and the upper-end part of the third link member 3. Further, the lower-end part of the third link member 3 is connected to the second member 22 of the second link 20.

According to the above configuration, the joint part 40 can pivot the second link 20 about the pitch axis (second shaft member 52) relative to the first link 10, when the first linear-motion actuator 30A and the second linear-motion actuator 30B both carry out the extending operation or the contracting operation. Further, as one of the first linear-motion actuator 30A and the second linear-motion actuator 30B carries out the extending operation and the other carries out the contracting operation, the joint part 40 can pivot the second link 20 about the roll axis (first shaft member 51) relative to the first link 10.

[Configuration of Joint Mechanism]

Next, a configuration of the joint mechanism 41 is described with reference to FIGS. 2 to 5.

Figure 3:
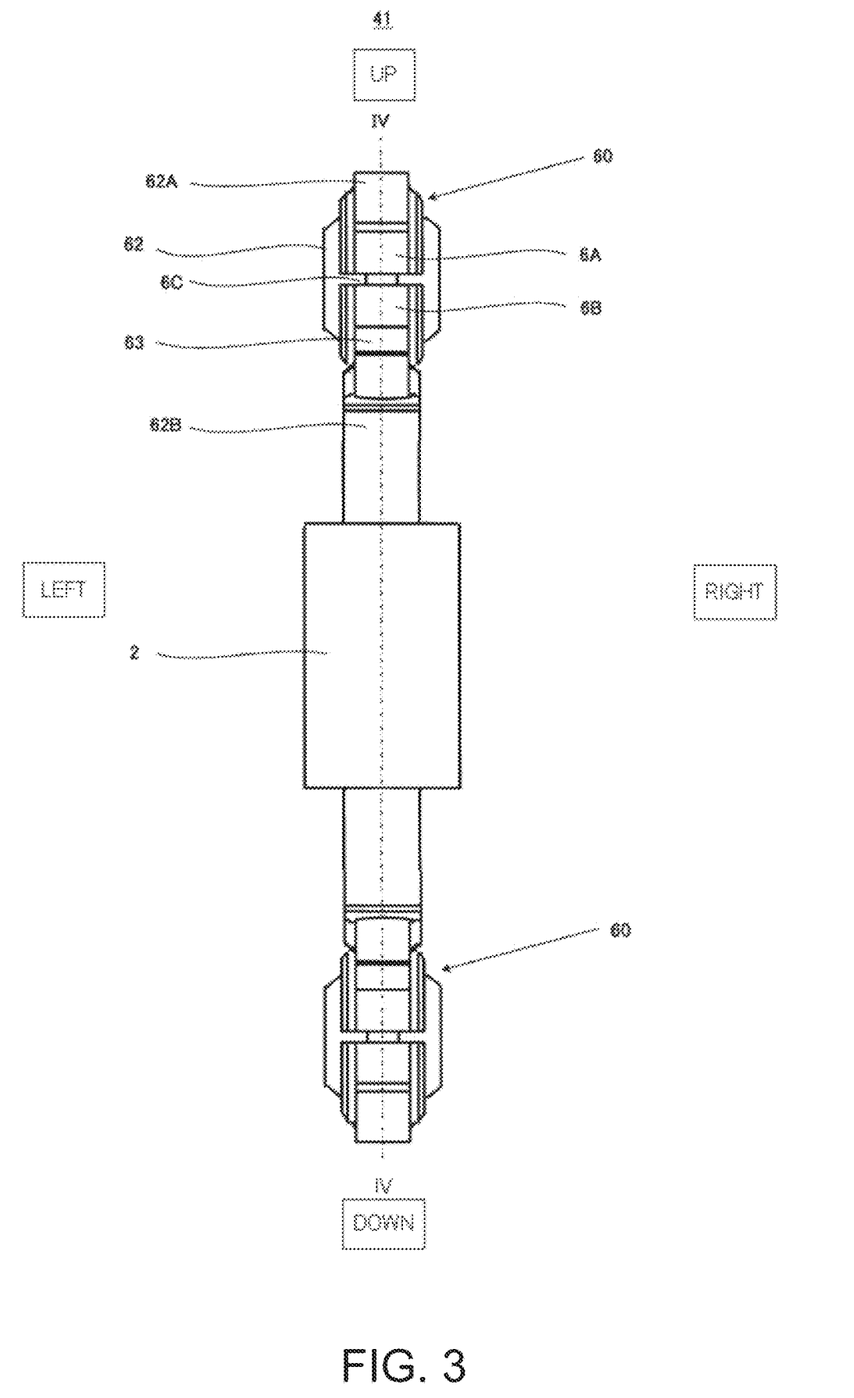
FIG. 3 is a rear view of a joint mechanism illustrated in FIG. 2.
Figure 4:
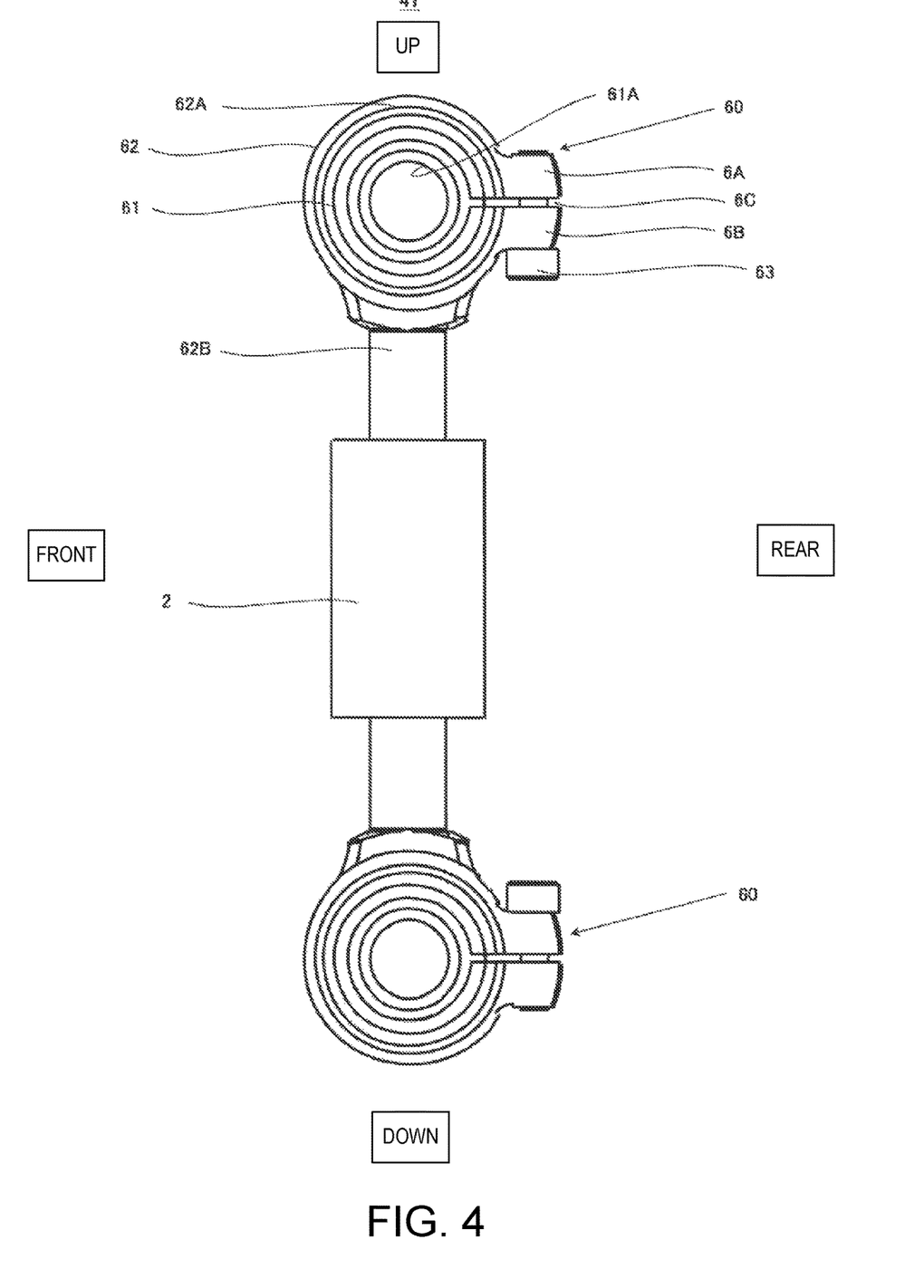
FIG. 4 is a side view of the joint mechanism illustrated in FIG. 2.
Figure 5:
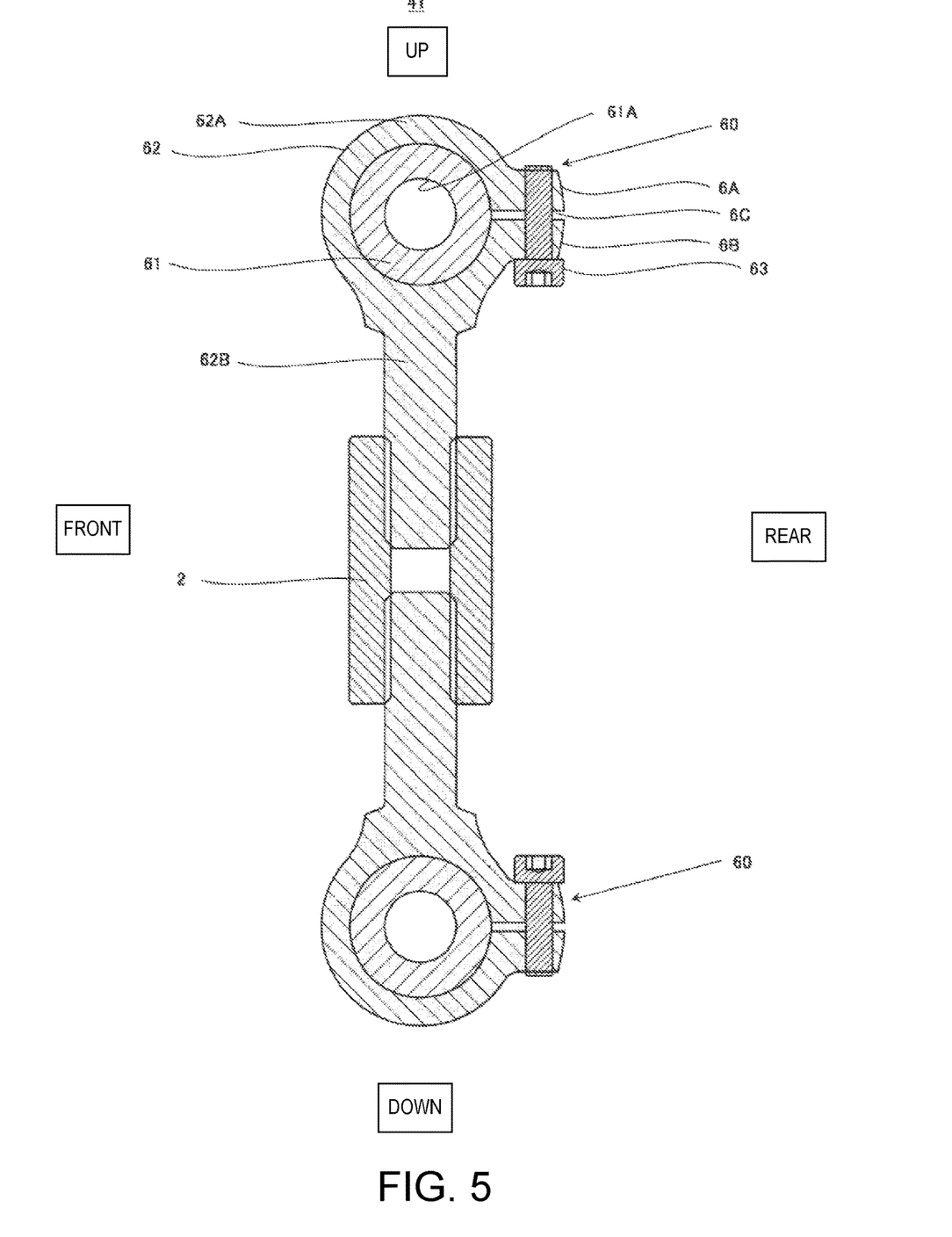
FIG. 5 is a cross-sectional view of the joint mechanism illustrated in FIG. 3, taken along a line IV-IV.

FIG. 3 is a rear view of the joint mechanism illustrated in FIG. 2. FIG. 4 is a side view of the joint mechanism illustrated in FIG. 2. FIG. 5 is a cross-sectional view of the joint mechanism illustrated in FIG. 3, taken along a line IV-IV.

As illustrated in FIGS. 3 to 5, the joint mechanism 41 is provided with the second link member 2 and the spherical joint 60, and the spherical joint 60 is fixed to the second link member 2 by a suitable method. For example, a thread may be formed on each of an inner circumferential surface of the second link member 2 and an outer circumferential surface of a connecting part 62B (described later) of the spherical joint 60, and the spherical joint 60 may be threadedly engaged with the second link member 2. Alternatively, for example, the spherical joint 60 may be fixed to the second link member 2 by welding.

The spherical joint 60 has a ball member 61, a socket 62, and a fastening member 63. The ball member 61 is formed in a spherical shape. In Embodiment 1, the ball member 61 is notched on the side surfaces in the left-and-right direction of the joint structure 100 so that flat surfaces are formed. A through-hole 61A is formed in the ball member 61 so as to extend in the left-and-right direction, and the fourth shaft member 54 or the sixth shaft member 56 is inserted in the through-hole 61A.

The socket 62 has a cage part 62A where an inner circumferential surface which spherically contacts the ball member 61 is formed, and the bar-shaped connecting part 62B formed so as to extend from the outer circumferential surface of the cage part 62A.

A slit-shaped opening 6C is formed in the cage part 62A. In other words, the cage part 62A is formed in a C-shape (or a U-shape). The opening 6C is formed in a part of the inner circumferential surface other than a part where the largest load is applied.

Here, the part of the inner circumferential surface where the largest load is applied may be a part located in the extending direction of the connecting part 62B. Alternatively, the part of the inner circumferential surface where the largest load is applied may be a part located in the reciprocating direction (the up-and-down direction of the joint part 40) of the rod member 33 of the first linear-motion actuator 30A (second linear-motion actuator 30B).

Note that the spherical joint 60 may be disposed so that the opening 6C is located outward of the robot 200. In detail, if the robot 200 is a humanoid robot, the spherical joint 60 may be disposed at the robot 200 so that the opening 6C is located forward or rearward. Alternatively, if the robot 200 is a humanoid robot, the spherical joint 60 may be disposed at the robot 200 so that the opening 6C is located leftward or rightward.

Alternatively, the opening 6C may be formed in the cage part 62A so as to be located in a direction perpendicular to the extending direction of the connecting part 62B.

Further, protrusions 6A and 6B are provided in both end parts of the cage part 62A which form the opening 6C so as to extend rearward. The protrusions 6A and 6B are provided so as to protrude from the outer circumferential surface of the cage part 62A. Further, through-holes are formed in the protrusions 6A and 6B so as to extend in the up-and-down direction and so as not to communicate with the inner circumferential surface of the cage part 62A, and the fastening member 63 is inserted in the through-holes.

The fastening member 63 can reduce the space volume of the opening 6C by bringing the protrusions 6A and 6B closer to each other. Therefore, a radius of curvature of the inner circumferential surface of the cage part 62A can be reduced.

Further, the fastening member 63 is configured so as not to contact the ball member 61. Therefore, the movement of the ball member 61 will not be restricted.

In the thus-configured spherical joint 60 according to Embodiment 1 and the joint structure 100 for the robot having the spherical joint 60, the fastening member 63 which reduces the space of the opening 6C is disposed at the protrusions 6A and 6B of the cage part 62A.

Therefore, even when rattling occurs in the spherical joint due to wearing of the inner circumferential surface of the cage part 62A and running out of grease filled up inside the socket 62, the rattling can be eliminated by the fastening member 63 reducing the radius of curvature of the inner circumferential surface of the cage part 62A. Further, before the rattling occurs, the rattling can be suppressed by the fastening member 63 reducing the radius of curvature of the inner circumferential surface of the cage part 62A.

Moreover, the spherical joint 60 and the joint structure 100 for the robot having the spherical joint 60 according to Embodiment 1 is configured so that the fastening member 63 does not contact the ball member 61. Therefore, the movement of the ball member 61 will not be restricted.

Further, in the spherical joint 60 and the joint structure 100 for the robot having the spherical joint 60 according to Embodiment 1, the opening 6C is located outward of the robot 200.

Therefore, it can be suppressed that the protrusions 6A and 6B interfere with operation of the robot 200. Further, since the fastening member 63 can be accessed easily, maintenance of the robot 200 (spherical joint 60) can be performed easily.

Embodiment 2

A spherical joint according to Embodiment 2 is configured, in the spherical joint according to Embodiment 1, so that the socket is divided into two or more sections, and the fastening member couples the two or more sections of the divided socket.

Below, one example of the spherical joint according to Embodiment 2 is described with reference to FIG. 6.

Figure 6:
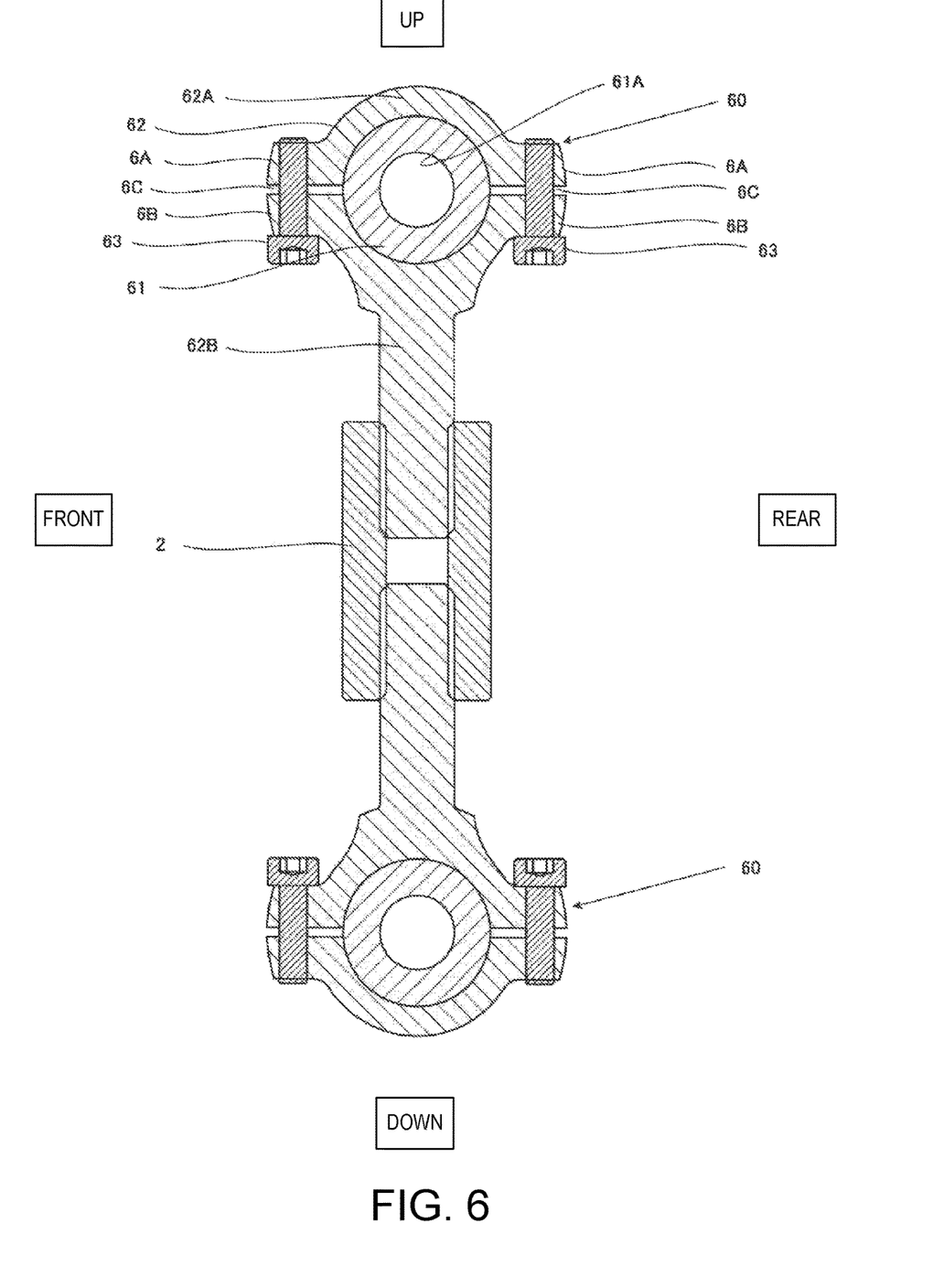
FIG. 6 is a cross-sectional view illustrating an outline configuration of a joint mechanism having a spherical joint according to Embodiment 2.

FIG. 6 is a cross-sectional view illustrating an outline configuration of a joint mechanism having the spherical joint according to Embodiment 2.

As illustrated in FIG. 6, the spherical joint 60 according to Embodiment 2 is the same in the fundamental configuration as the spherical joint 60 according to Embodiment 1, but it differs in that the socket 62 is divided into two or more (here, two). In detail, the cage part 62A of the socket 62 is divided into upper and lower parts.

Further, in the spherical joint 60 according to Embodiment 2, the protrusions 6A and 6B are provided also in the front part of the cage part 62A so as to protrude forward, and the opening 6C is formed between the protrusions 6A and 6B. Further, the fastening member 63 is disposed also at the front protrusions 6A and 6B.

Note that, although in Embodiment 2 the opening 6C is formed in both the front part and the rear part of the cage part 62A, the opening 6C may be formed only in either one of them.

The spherical joint 60 according to Embodiment 2 configured in this way can also obtain similar operation and effects to the spherical joint 60 according to Embodiment 1.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

INDUSTRIAL APPLICABILITY

Since the spherical joint and the joint structure for the robot having the spherical joint of the present disclosure can eliminate or suppress rattling, it is useful.

What is claimed is:

1. A joint structure in a robot, the joint structure comprising a spherical joint comprising:
   a ball member; and
   a socket having an inner circumferential surface configured to spherically contact the ball member,
   wherein the socket includes a cage part forming the inner circumferential surface and having an opening, protrusions between which the opening is formed, and a connecting part provided to the cage part,
   wherein a fastening member is disposed at the cage part such that a gap is formed between the fastening member and the ball member, the fastening member being configured to reduce a space of the opening,
   wherein the opening is formed in a part of the inner circumferential surface other than a part where a load is applied to the inner circumferential surface from the connecting part,
   wherein the connecting part is formed in a bar shape,
   wherein the part of the inner circumferential surface of the socket where the load is applied is aligned with an extending direction of the connecting part, and
   wherein the opening of the socket is disposed facing outward of the robot so that the fastening member is accessible and an amount by which the protrusions extend is restricted so as not to interfere with operation of the robot.

2. The spherical joint of claim 1, wherein the cage part of the socket is formed in a C-shape, and the fastening member is configured to bring both ends of the cage part closer to each other.

3. The spherical joint of claim 1, wherein the socket is divided into two or more sections, and
   wherein the fastening member is configured to couple the two or more sections of the divided socket.

4. The joint structure of claim 1, wherein the joint structure is used for an ankle joint or a hip joint of a humanoid robot.

* * * * *